Aug. 28, 1951     M. N. MOSSEL     2,565,874
BUTTER AND SALT SPREADER FOR CORN-ON-THE-COB
Filed April 15, 1946
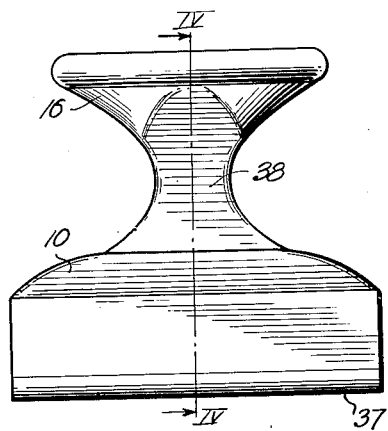
Fig. 1.
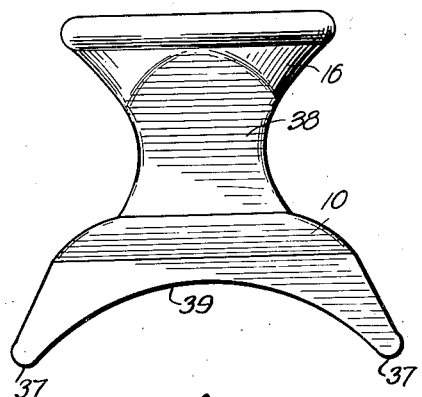
Fig. 2.
Fig. 3.
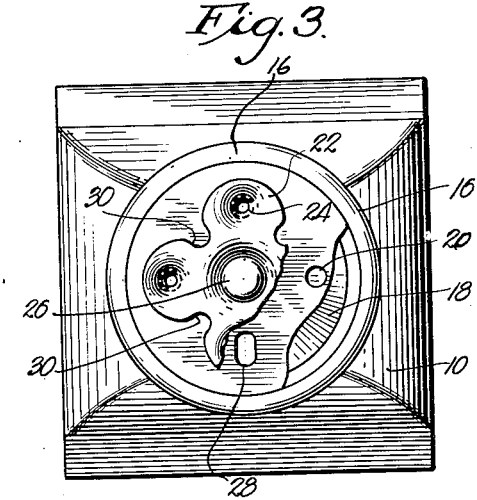
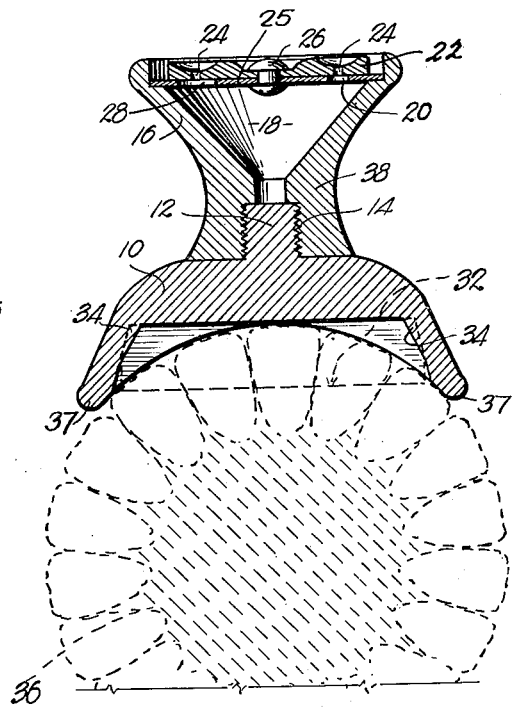
Fig. 4.
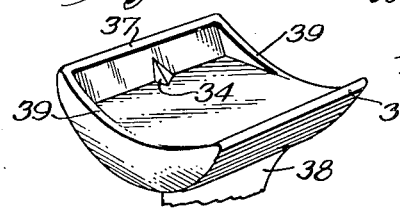
Fig. 5.
INVENTOR.
Max N. Mossel
BY
ATTORNEY.

Patented Aug. 28, 1951

2,565,874

UNITED STATES PATENT OFFICE 2,565,874

BUTTER AND SALT SPREADER FOR CORN-ON-THE-COB

Max N. Mossel, Fulton, Mo.

Application April 15, 1946, Serial No. 662,110

1 Claim. (Cl. 65—12)

This invention relates to tableware in the character of a manually manipulable applicator for butter and salt that has for its primary aim to provide an unique, novel, compact and efficiently operating tool for use on the dining table in quickly spreading butter and sprinkling salt directly onto corn-on-the-cob.

One of the important aims of this invention is to provide a butter and salt spreader for corn-on-the-cob which is provided with means for positively mounting the pat of butter in place during its application to the surface of the corn and which is provided with a container for the salt to be applied, which container is cooperatively interconnected to the butter applying portion of the spreader in a way allowing the container for the salt to be filled when the same is disassembled from the butter spreading portion.

Further objects of the invention include the specific manner of constructing the spreader, the way of forming the parts thereof to accomplish the end desired and the unique form of the entire assembly that renders the same easy to manipulate as well as further aims which will appear during the course of the following specification referring to the accompanying drawing, wherein:

Fig. 1 is a side elevational view of the butter and salt spreader for corn-on-the-cob made pursuant to my invention.

Fig. 2 is an end elevational view thereof.

Fig. 3 is a top plan view.

Fig. 4 is a sectional view taken on line IV—IV of Fig. 1 showing the spreader in place on an ear of corn; and Fig. 5 is a fragmentary, inverted, perspective view of the spreader.

This application is a continuation in part of my co-pending application, Serial No. 639,874, filed January 8, 1946, now U. S. Letters Patent No. 2,478,122, dated August 2, 1949, for Corn-on-Cob-Butterer, and the broad object of the invention about to be described is, in the main, substantially the same as the primary aims of the invention described in the said co-pending application.

It is always desirable to have available a convenient tool or applicator for butter and salt when they are to be evenly spread over the surface of an ear of corn. The spreader now to be specified is simpler in form than the one disclosed in my co-pending application and includes in addition thereto, a conveniently disposed salt shaker that is contoured and so attached to the butter spreader as to render manual manipulation easy and effective.

In the form of the invention chosen for illustration, the numeral 10 designates a substantially tray-like body having an externally threaded boss 12 on the top thereof to be received within an internally threaded socket 14 formed in the end of the salt container 16. This salt container has a cavity 18 therein which communicates with socket 14 and therefore, when container 16 is removed from association with body 10, it is possible to fill cavity 18 with a quantity of salt to be shaken therefrom through the perforations 20 formed in the top thereof. Perforations 20 are opened and closed through the medium of a plate 22 having a number of holes 24 provided therethrough and formed as clearly shown in Fig. 3. Plate 22 is rotatably secured to the top perforated wall 25 of container 16 by a rivet or the like 26 that allows rotation of plate 22 and, therefore, permits holes 24 to be brought into register with perforations 20. One of perforations 20 is a relatively large aperture 28 through which container 16 may be loaded when plate 22 is turned to a position where one of the notches 30 uncovers this said aperture.

When plate 22 is formed as shown in Fig. 3, a notch 30 is between each hole 24, and it therefore, becomes necessary only to rotate plate 22 through 45 degrees in order to have aperture 28 accessible.

Body 10 is unique in its ability to support a pat of butter 32 and prevent its slipping from within its tray-like confines as shown in Fig. 4. Body 10 has a pair of spaced, outwardly flared flanges 37 extending in opposed relation to boss 12 forming sides of such butter receiving tray or cavity. These flanges 37 are joined by a pair of spaced arcuate flanges 39 forming end walls for the butter tray. These flanges 39 conform to the contour of an ear of corn 36 and curve outwardly from the bottom of the tray toward the walls 37 with which they join as clearly shown in Fig. 5. A pointed, wedge-shaped ear 34 is disposed along the innermost face of each flange 37 respectively, intermediate the ends thereof at the innermost longitudinal edge thereof. These ears project into the pat of butter 32 to prevent its slipping from place when the spreader is moved over the surface of the ear of corn 36. When all of the butter has been spread upon the surface of the ear of corn 36, the container 16 may be brought into play merely by reversing the position of the spreader and since the manipulator will grasp the neck 38 between the first two fingers during the spreading of the butter, it will be easy to reverse the position of the spreader and have the same available for sprinkling of salt directly on to the corn.

It is realized that spreaders having physical characteristics different from those shown in the drawing and above described may be made without departing from the spirit of the invention or scope of the appended claim.

Having thus described the invention, what is claimed as new and desired to be secured by Letters Patent is:

In a tableware article having a hollow body adapted to receive salt and provided with an inlet opening, a butter spreader for corn-on-the-cob comprising a member having a part adapted for removable connection with said body in closing relationship in said inlet opening, said member being provided with a cavity on one face thereof opposed to said part, there being a pair of opposed, outwardly-flared flanges having spaced, interconnecting walls, said flanges and said walls defining said cavity, said walls being cut away to conform to the contour of the ear of corn; and means in the cavity for holding a pad of butter therewith, said body having an hourglass conformation whereby the same serves as a handle for the member.

MAX N. MOSSEL.

REFERENCES CITED

The following references are of record in the file of this patent:

UNITED STATES PATENTS

| Number | Name | Date |
|---|---|---|
| 54,054 | Bullard | Apr. 17, 1866 |
| 83,341 | Towndrow | Oct. 20, 1868 |
| 145,145 | Baggs | Dec. 2, 1873 |
| 148,472 | Lockwood | Mar. 10, 1874 |
| 159,895 | Burger | Feb. 16, 1875 |
| 199,896 | Burger | Feb. 5, 1878 |
| 433,331 | Tyson | Oct. 14, 1890 |
| 527,999 | Leach | Oct. 23, 1894 |
| 1,097,465 | Pratt | May 19, 1914 |
| 1,267,961 | Bennett | May 28, 1918 |
| 1,564,336 | Fishback | Dec. 8, 1925 |
| 1,829,664 | McKay | Oct. 27, 1931 |
| 2,028,870 | Jennings | Aug. 24, 1935 |
| 2,098,832 | Payson | Nov. 9, 1937 |
| 2,171,919 | Dodge | Sept. 5, 1939 |
| 2,340,841 | Black | Sept. 26, 1940 |
| 2,389,385 | Owen | Nov. 20, 1945 |
| 2,478,122 | Mossel | Aug. 2, 1949 |

FOREIGN PATENTS

| Number | Country | Date |
|---|---|---|
| 400,056 | Great Britain | Oct. 19, 1933 |